US008929382B2

(12) United States Patent
Ramachandran et al.

(10) Patent No.: US 8,929,382 B2
(45) Date of Patent: *Jan. 6, 2015

(54) METHOD, DEVICE, AND COMPUTER PROGRAM PRODUCT FOR DETECTING AND ENCODING STATES FOR ACCURATE MEASUREMENT

(75) Inventors: Gomathi Ramachandran, Holmdel, NJ (US); Leonard A. Ciavattone, Holmdel, NJ (US); Alfred C. Morton, Jr., Oceanport, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 169 days.

This patent is subject to a terminal disclaimer.

(21) Appl. No.: 13/618,269

(22) Filed: Sep. 14, 2012

(65) Prior Publication Data

US 2013/0010608 A1 Jan. 10, 2013

Related U.S. Application Data

(63) Continuation of application No. 12/622,147, filed on Nov. 19, 2009, now Pat. No. 8,284,778.

(51) Int. Cl.
*H04L 12/28* (2006.01)
*G01R 31/08* (2006.01)
*H04L 12/26* (2006.01)

(52) U.S. Cl.
CPC .......... *H04L 43/0852* (2013.01); *H04L 43/026* (2013.01)
USPC .......................................... 370/394; 370/242

(58) Field of Classification Search
CPC ...................................... H04L 12/28
USPC ............. 370/394, 351, 395.1, 252–254, 474, 370/235, 244, 503, 519, 400; 709/225, 226, 709/224
See application file for complete search history.

(56) References Cited

U.S. PATENT DOCUMENTS

| 6,930,982 | B2 | 8/2005 | Jagadeesan |
| 7,082,129 | B2 | 7/2006 | Cromer et al. |
| 7,171,683 | B2 | 1/2007 | Pazi et al. |
| 7,463,654 | B2 | 12/2008 | Riegel et al. |
| 7,773,611 | B2 | 8/2010 | Booth, III et al. |
| 8,259,582 | B2 * | 9/2012 | Friedman et al. ............. 370/235 |
| 8,284,778 | B2 * | 10/2012 | Ramachandran et al. .... 370/394 |
| 2006/0047807 | A1 | 3/2006 | Magnaghi |

* cited by examiner

*Primary Examiner* — Hanh N Nguyen
(74) *Attorney, Agent, or Firm* — Cantor Colburn LLP

(57) ABSTRACT

A method, device, and program for determining states in a flow of packets are provided. A flow of transmitted packets is received. When the difference between the sequence number of the arriving packet and the next expected sequence number is equal to zero and when the TTL number of the arriving packet is equal to the TTL number of the previous packet, there is a stable state beginning with the first of the consecutively received packets. If a difference between the sequence number of an arriving packet and a next expected sequence number is greater than 1, or TTL of the arriving packet is not equal to the TTL number of the previous packet, there is a not stable state. Time between end of one stable state and start of the next stable state is the hole, and the states and holes correlate to events for analysis of the network.

20 Claims, 9 Drawing Sheets

FIG. 3

TABLE 1

| TxTime (ms) | RxTime (ms) | RtDelay (ms) | TtClkDelta (ms) | RtClkDelta (ms) | TxSeq No | RxSeq No | TxTTL | RxTTL |
|---|---|---|---|---|---|---|---|---|
| 20702358 | 20702494 | 136 | 71 | 65 | 1 | 1 | 246 | 246 |
| 20702458 | 20702594 | 136 | 71 | 65 | 2 | 2 | 246 | 246 |
| ... | | | | | | | | |
| 20928134 | 20928271 | 137 | 71 | 66 | 2259 | 2259 | 246 | 246 |
| 20928234 | 20928371 | 137 | 71 | 66 | 2260 | 2260 | 246 | 246 |
| 20928334 | 20928476 | 142 | 71 | 71 | 2261 | 2261 | 246 | 245 |
| ... | | | | | | | | |
| 20929933 | 20930076 | 143 | 72 | 71 | 2277 | 2277 | 246 | 245 |
| 20930033 | 20930176 | 143 | 72 | 71 | 2278 | 2278 | 246 | 245 |
| 20930733 | 20930868 | 135 | 72 | 63 | 2285 | 2285 | 246 | 244 |
| 20930833 | 20930969 | 136 | 71 | 65 | 2286 | 2286 | 246 | 248 |
| 20930933 | 20931069 | 136 | 71 | 65 | 2287 | 2287 | 246 | 248 |
| 20931033 | 20931169 | 136 | 71 | 65 | 2288 | 2288 | 246 | 248 |
| 20931133 | 20931270 | 137 | 72 | 65 | 2289 | 2289 | 245 | 248 |
| 20932533 | 20932670 | 137 | 72 | 65 | 2303 | 2303 | 245 | 248 |
| 20932633 | 20932770 | 137 | 72 | 65 | 2304 | 2304 | 245 | 248 |
| 20940032 | 20940161 | 129 | 64 | 65 | 2378 | 2305 | 248 | 248 |
| 20940132 | 20940261 | 129 | 64 | 65 | 2379 | 2306 | 248 | 248 |
| ... | | | | | | | | |
| 21602591 | 21602720 | 129 | 65 | 64 | 9004 | 8931 | 248 | 248 |
| 21602691 | 21602820 | 129 | 64 | 65 | 9005 | 8931 | 248 | 248 |

September Sample Data:

| | |
|---|---|
| Total number of State Changes = 396 | |
| Holes Analysis | |
| Number of holes | 323 |
| Number of holes > 100 ms | 288 |
| Average hole length | 3.4s |
| Average length of holes > 100ms for events | 3.7s |

FIG. 9

REPORT

| Source | Dest | Start of Hole 1 | Pre Hole 1 Time (ms) | Hole 1 Duration (Dur) (ms) | Time Between Hole 1 and 2 (ms) | Hole 2 Dur (ms) | Time Between Hole 1 and 2 (ms) | Hole 3 Dur (ms) | Post Hole 3 Time (ms) |
|---|---|---|---|---|---|---|---|---|---|
| New York | New Orleans | 17:27:52.947 | 771,863 | 5,815 | 4,203 | 39 | 58,755 | 50 | 54,412 |
| Atlanta | New Orleans | 17:27:52.949 | 772,012 | 5,666 | 4,000 | 340 | 53,906 | 49 | 59,105 |
| Orlando | New Orleans | 17:27:52.953 | 771,963 | 5,666 | 4,650 | 50 | 51,006 | 50 | 61,703 |

METHOD, DEVICE, AND COMPUTER PROGRAM PRODUCT FOR DETECTING AND ENCODING STATES FOR ACCURATE MEASUREMENT

This application is a continuation of U.S. Non-Provisional application Ser. No. 12/622,147, entitled "METHOD, DEVICE, AND COMPUTER PROGRAM PRODUCT FOR DETECTING AND ENCODING STATES FOR ACCURATE MEASUREMENT", filed Nov. 19, 2009, which is incorporated herein by reference in its entirety.

BACKGROUND

Exemplary embodiments relate to the flow of packets, and more particularly to, detecting and encoding states for accurate measurement of the flow of packets.

Network operators are faced, on a daily basis, with various network issues that can affect the performance of the network infrastructure. Addressing such issues can require the development of effective detection technologies and analysis of the obtained data. The range of network issues that may appear in large networks are broad and continue to evolve over time as new protocols and applications are developed. Also, events that disrupt customer flow on the network have to be better understood at smaller and smaller timescales.

BRIEF SUMMARY

Exemplary embodiments include a method for determining states in a flow of packets and encoding the states on a computer. A flow of transmitted packets is received and each packet has a monotonically increasing transmit sequence number. For each packet a Next Expected Sequence number is equal to the largest previous sequence number of a previously received packet incremented by 1. For a predefined number of consecutively received packets, when the difference between the sequence number of the arriving packet and the next expected sequence number is zero and when the TTL number of the arriving packet is equal to the TTL number of the previous packet, it is determined that there is a stable state beginning with the first of the consecutively received packets. Subsequently, for each packet received, it is determined if a difference between the sequence number of an arriving packet and a next expected sequence number is greater than 1, and the next expected sequence number is equal to a previous sequence number of a previous packet incremented by 1. When the difference between the sequence number of the arriving packet and the next expected sequence number is greater than 1, it is determined that there is a not stable state. For each packet received, it is determined if a time to live (TTL) number of the arriving packet is equal to a TTL number of the previous packet. When the TTL number of the arriving packet is not equal to the TTL number of the previous packet, it is determined that there is the not stable state.

Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 3 depicts a table in accordance with exemplary embodiments;

FIG. 9 illustrates an example report for a time period in accordance with exemplary embodiments.

The detailed description explains exemplary embodiments, together with features, by way of example with reference to the drawings.

DETAILED DESCRIPTION OF EXEMPLARY EMBODIMENTS

In a large data network it is very difficult to track each interruption in a data flow. The data flows may either be from a measurement system that inserts packets in a network and/or by passive snooping of packets in the network. Since the volume of data is very large, conventional systems and methods do not have good ways of capturing the large amount information and presenting the information in a way that can be used efficiently. Researchers can look very carefully at a limited number of flows from test lab or field data, but the process tends to be limited and labor-intensive.

Exemplary embodiments provide one or more applications that allow the automation of the detection of outages. The application vastly reduces the set of metrics to store (by utilizing a state encoding scheme) that describe the flow and the timeline of its interruptions, from which the data-flow interruptions can be either mathematically analyzed or visually displayed by the application.

In exemplary embodiments, the application is operative to determine and correlate data for sub-second (e.g., less than 1 second) convergence times on a large scale, and the data may be from a large active measurement system (and/or passive data flow analysis) that produces data on billions of packets per day. According to exemplary embodiments, the application is configured to reduce this data and encode the data in order to allow analysis of events. The application may achieve this goal by encoding packet streams into stable and not stable "states" depending on the properties of the packet flow. This further enables the application to correlate to network "events" such as failures or maintenance, and allows the application to determine outage length distributions by cause. The use of the term packet should be understood to contemplate any suitable segmentation of data, such as packets, frames, units of data, and/or cells In accordance with exemplary embodiments, the application is configured to evaluate arriving packets using their sequence numbers and Time-To-Live (TTL) fields, and the application uses this information in the state transition criteria. The not stable state may have impairments such as loss of packets and/or reordering of packets, and the TTL in the not stable state may vary from packet to packet. State evaluation is based on unidirectional criteria. For example, a flow could be stable in one direction (unidirectional) such as the transmit direction of the path and yet not stable in the reverse direction (bidirectional) such as the receive direction of the path. The time of day associated with transitions between these two states, stable and not stable, is the feature to correlate with events observed in the control plane or network element monitors (e.g., passive data).

Figure 1:
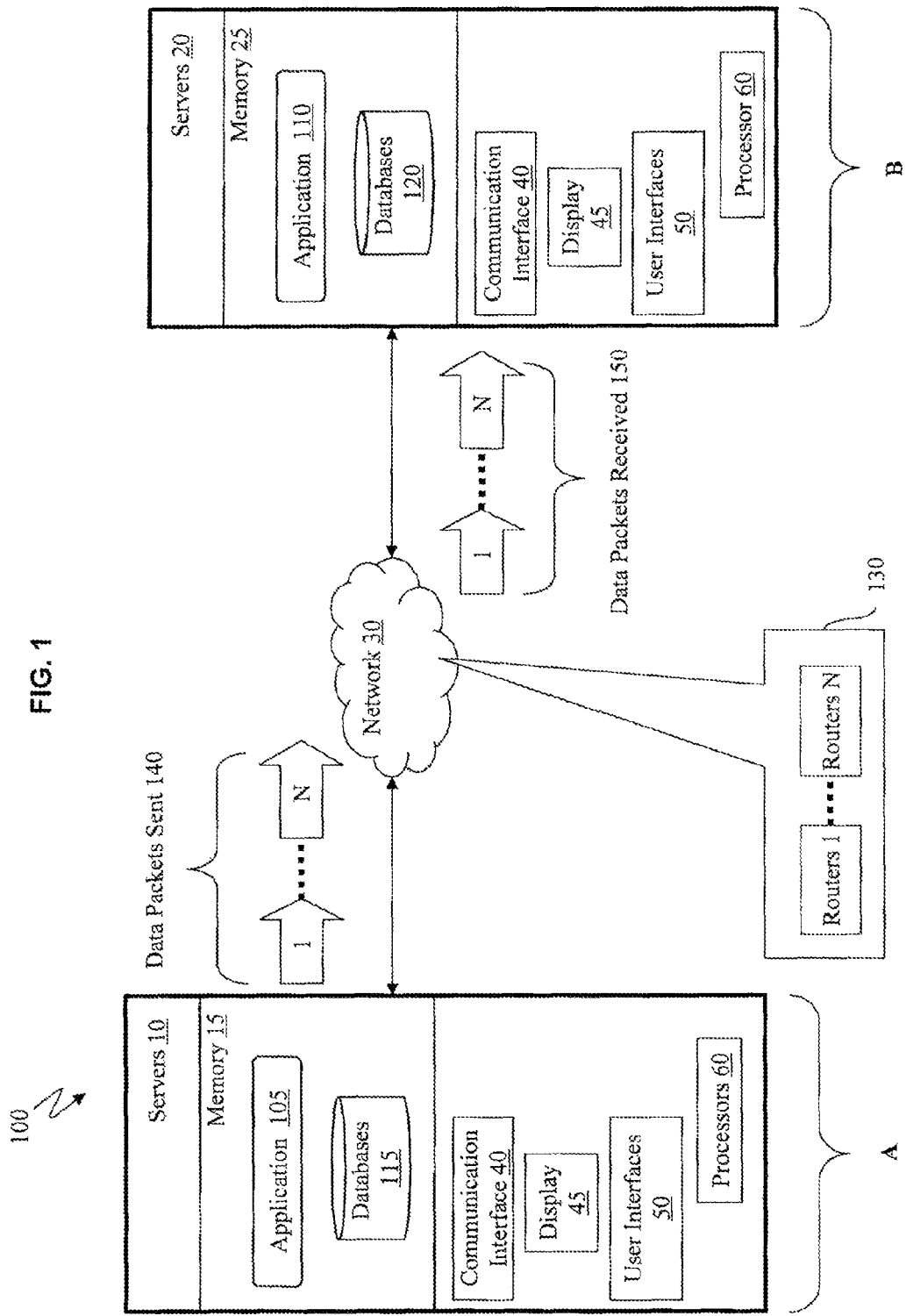
FIG. 1 illustrates a block diagram in accordance with exemplary embodiments.

Now turning to FIG. 1, FIG. 1 illustrates a block diagram 100 in accordance with exemplary embodiments. In FIG. 1, point A communicates with point B over one or more networks 30. Points A and B may be representative of various communication devices, such as, e.g., customer premises equipment, network equipment, and so forth. Also, the communication devices of points A and B may include mobile telephones, landline telephones, smart telephones, soft telephones, personal digital assistants, set top boxes (STB), televisions (TV), game consoles, MP3 players, computers, and servers.

For explanation purposes, point A may be server 10 and point B may be server 20. The servers 10 and 20 may include memory 15 and 25, which includes a computer readable storage medium. The servers 10 and 20 may include one or more applications 105 and 110 that are configured with computer executable instructions to implement exemplary embodiments discussed herein. The applications 105 and 110 may include and/or represent numerous software components for carrying out the operations and functions of exemplary embodiments.

The memory 15 and 25 may include one or more databases 115 and 120. The servers 10 and 20 include communication interfaces 40, such as the software and hardware understood by one skilled in the art, for communicating over the network 30. The servers 10 and 20 include displays 45, user interfaces 50, and processors 60. The user interfaces may include, e.g., a mouse, track ball, pointing devices, keyboard, etc., for inputting commands.

Further regarding the network 30, the network 30 may include circuit-switched and/or packet-switched technologies and devices, such as routers, switches, hubs, gateways, etc., for facilitating communications. The network 30 may include wireline and/or wireless components utilizing, e.g., IEEE 802.11 standards for providing over-the-air transmissions of communications. The network 30 can include IP-based networks for communication between a customer service center and clients/users. The network 30 can manage multiple accounts as established by particular users. These accounts may then be used to provide access to services as described herein. Also, the network 30 may include wireline and/or wireless components utilizing standards, e.g., multimedia messaging services (MMS). The network 30 may include a multimedia messaging center (MMC), which implements the network side of multimedia messaging service (MMS) and makes it possible for an operator to offer multimedia messaging to mobile communication device users. The network 30 can include a managed IP and/or wireless network administered by a service provider, which can control bandwidth and quality of service for the communications discussed herein. The network 30 may be implemented in a wireless fashion, e.g., using wireless protocols and technologies, such as Wi-Fi®, WiMAX™, Bluetooth®, etc. The network 30 can also be a packet-switched network, such as a local area network, a wide area network, a metropolitan area network, an Internet network, or other similar types of networks. The network 30 may be a cellular communications network, a fixed wireless network, a wireless local area network (LAN), a wireless wide area network (WAN), a personal area network (PAN), a virtual private network (VPN), an intranet or any other suitable network, and the network 30 may include equipment for receiving and transmitting signals, such as a cell tower, a mobile switching center, a base station, and a wireless access point.

The network 30 may include routers 130 illustrated as router 1 through router N. The application 105 of the server 10 transmits packets 140 via the network 30 to the server 20 to be received as received packets 150 by the application 110. Although a unidirectional example is shown in which server 10 transmits packets 140 to server 20, it is understood that the reverse it true.

The application 110 takes the incoming flow of data packets 150 and classifies the data packets into stable and not stable states. As the packets 150 arrive at the server 20, the application 110 is operative to designate the packets 150 as successful or impaired according to an "OR" of two evaluations.

One evaluation by the application 120 is based on the individual packet's 150 time to live (TTL). In this disclosure, an arriving packet refers to a current packet being received at, e.g., the server 10 or 20, and each arriving packet may be evaluated as discussed herein. It is understood that after one packet arrives subsequent packets (and/or burst of packets) may continue to arrive and each subsequent packet would have its turn as the arriving packet. If an arriving packet's TTL is equal to the previous TTL of the previous packet, then the arriving packet is successful. Otherwise, the packet is impaired. A TTL number is a limit on the period of time, number of iterations, and/or number of transmissions in the network 30 that a unit of data (e.g. a packet 150) can experience before it should be discarded. Each time a data packet 150 is routed by one of the routers 130, that data packet's TTL is decremented by 1. Ideally, each packet 150 being received by the server 20 should have the same TTL number, which may indicate that each packet traveled the same path over the network 30 from server 10 to server 20. For example, if the TTL number changes from one packet to the next packet, the change is a definitive indication of a route change between to the two packets. Unfortunately, the converse is not true; that is, a lack of a TTL change does not necessarily mean that the path did not change because the new and old path could have the same TTL number.

The other evaluation by the application 120 is based on the next expected sequence number of an arriving data packet 150. Each packet sent (such as a sent packet 140) has a sequence number, such as 1, 2, 3, 4, . . . , 100, . . . N. For example, if the sequence number 200 is received for a packet at the server 20, the application 120 expects the next packet to have the sequence number 201, and so forth. If an arriving packet's sequence number (SeqNum) is equal to the next expected (NextExpected) sequence number, then the packet is successful. Otherwise, the packet may be impaired, and/or the packet may be designated non-ideal (depending on the difference between the sequence number and NextExpected). When the difference between the SeqNum−NextExpected>1, the arriving packet is designated impaired. Differences less than zero are non-ideal. The sequence of packet labels arranged in arrival order can be used to determine the state exhibited by the flow and inferred for the network 30.

Note that a packet may fail to be designated successful by the application 110 under sequence number evaluation in response to several different types of network impairments.

Loss, reordering, and duplication will all cause an arriving packet's sequence number to be different from the NextExpected. Loss is completely missing a packet 150 in the data flow. Reordered packets are packets that are not received according to the next expected packets, and these packets are indicators of routing loops or blenders. There may be convergence events that can occur without reordering, and reordering that can occur without a convergence event. Duplication is receiving the same packet twice.

Figure 2:
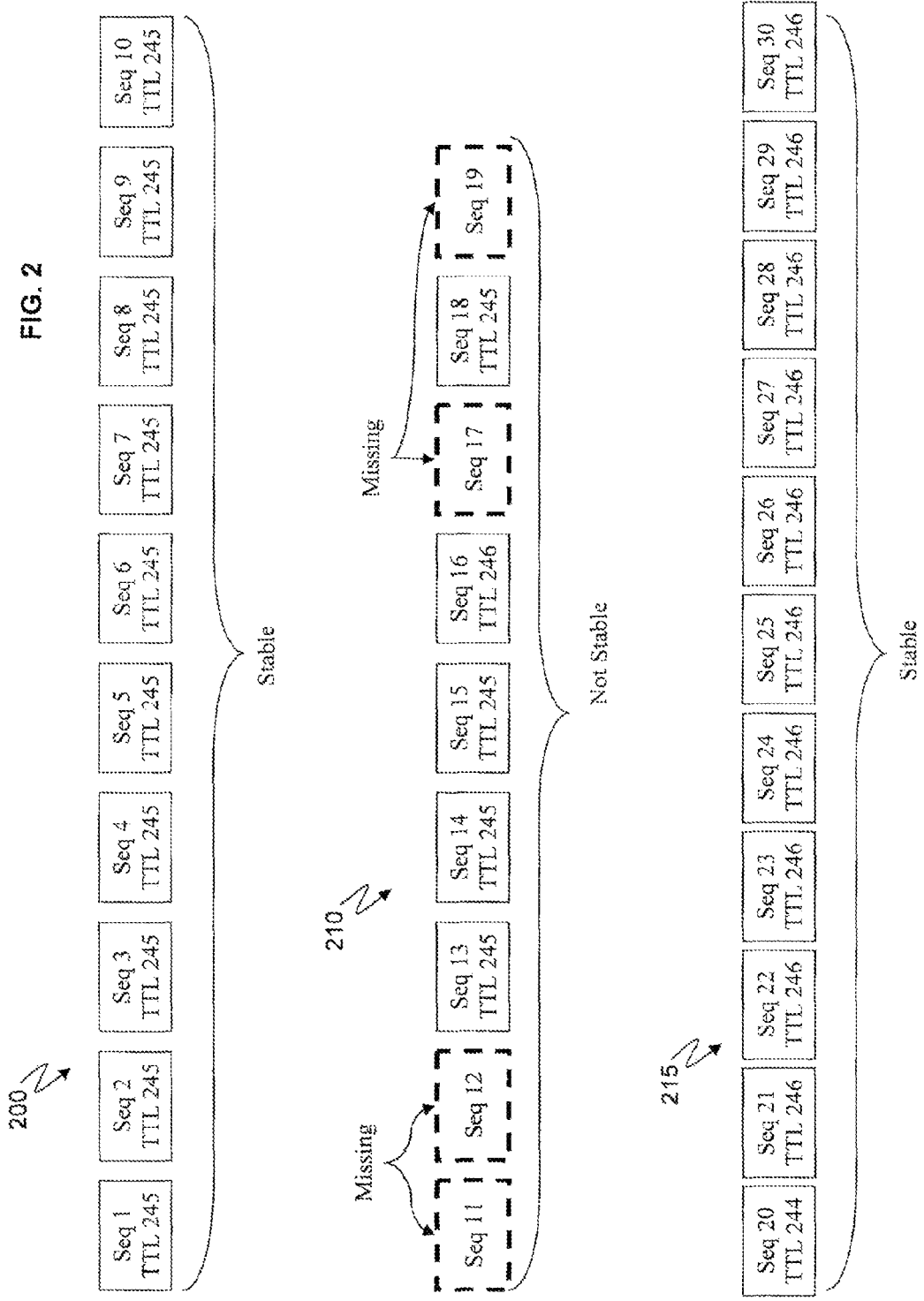
FIG. 2 illustrates an example of an application receiving and analyzing data packets in accordance with exemplary embodiments.

Turning now to an example to further explain stable states and not stable states, FIG. 2 illustrates an example of the application 110 receiving and analyzing data packets (e.g., data packets 150) shown in data flow 200, flow 210, and flow 215 in accordance with exemplary embodiments. Although the flows 200, 210, and 215 are separately designated in FIG. 2, this is only to assist in explanation and the flows 200, 210, and 215 represent one continuous flow of data packets.

The application 110 is operative to consider conditions for transitioning to the stable state. The application 110 is operative to evaluate the measurement flow 200 beginning with the first arriving packet. The first arriving packet has a sequence number 1 and a TTL of 245. The flow 200 is initially considered to be in a temporary "unknown" state (which will be eventually classified in the stable or the not stable state) by the application 110.

When successful packet arrivals continue for an entire Qualification Sample X, and there are no impaired packets observed, then the flow is considered to have transitioned to the stable state (beginning with the first packet in the Qualification Sample X and ending with the last consecutive packet having a stable state) by the application 110. Accordingly, for the application 110 to determine that there is a stable state, the application 110 determines that Qualification Sample has X packets with no TTL variation and all sequence numbers equaling the NextExpected sequence number throughout.

For example, in the flow 200, the Qualification Sample of X packets is 10. As such, 10 unimpaired data packets 150 have to be received before the application 110 determines that that there is a stable state for these packets 150. For the first packet, the application 110 stores the sequence number 1 and the TTL 245 in the database 120. The application 110 expects the next sequence number to be 2 for the second packet and the TTL to be 245. Likewise, the application 110 expects the third packet to have a sequence number 3 and a TTL 245. If the sequence numbers continue to incrementally increase by 1 and the TTL remains at 245 for all the packets 1-10, the application 110 is operative to determine that the packets 1-10 are stable. That is, once the Qualification Sample X (which is 10 in this example) is reached without any impairments (having the same TTL and having the NextExpected sequence number), the application 110 determines that the first through the tenth packets are designated as stable. The application 110 continues to monitor and evaluate subsequent packets being received at the server 20, and as long as subsequent arriving packets each have the same TTL number 245 and each continue to meet the requirement for the NextExpected sequence number at their respective turn, the application 110 is operative to add the subsequent packets to the stable state of the Qualification Sample X until the requirements for the stable state are no longer are true.

Referring back to FIG. 2, since the packets having sequence numbers 1-10 have been designated as stable by the application 110, exemplary embodiments now discuss conditions for transitioning to the not stable state. The application 110 evaluates the arriving sequence numbers (SeqNum) using the criteria to determine if there is a transition to the not stable state. As discussed herein, the following conditions are evaluated by the application 110:

IF SeqNum−NextExpected>1, THEN transition to Not Stable.  Equation (1)

OR

IF TTL of arriving packet≠TTL of previous packet, THEN transition to Not Stable.  Equations (2)

In FIG. 2, the flow 210 continues the illustration of packets in the flow 200. After the application 110 designates packets with sequence numbers 1-10 as stable, the application 210 continues the evaluation of arriving packets 150. Since the last packet had a sequence number 10 and TTL 245. The next expected sequence number is 11 with a TTL 245 by the application 110. The boxes with dashed lines represent missing packets. As seen in flow 210, the packet with the sequence number 11 is missing along with the packet having sequence number 12, and the application 110 never receives these packets. The next packet received by the application 110 has a sequence number 13 and TTL 245, but the application 110 expected the NextExpected sequence number to be 11. Since the current arriving sequence number 13 minus the NextExpected sequence number 11 is greater than 1 (SeqNum−NextExpected>1), the application 110 transitions the flow 210 to a not stable state after the packet having the sequence number 10 (shown in flow 200).

After sequence number 13, the packet with sequence number 14 arrives. Packet 14 has the correct TTL number 245 and is equal to the NextExpected sequence number, which is 14. After sequence number 14, the application 110 receives the arriving packet with a sequence number 15 (which is equal to the NextExpected sequence number since the previous sequence number was 14) and the packet 15 has a TTL 245 which is the same as the previous TTL 245 for packet 14. The application 110 determines that the packet having the sequence number 15 is not impaired. At this point, the application 110 determines that the packets with sequence numbers 13, 14, and 15 are consecutively unimpaired and the packets 13, 14, and 15 all have the same TTL number 245. However, the application 110 does not make any determination about the stability of the state at this point because a Qualification Sample X (which is 10 in this example) has not been met with X unimpaired packets. That is, there must be 10 (which is the Qualification Sample X) consecutive unimpaired packets before the application 110 determines that there is again a stable state.

The application 110 evaluates the arriving packet with the sequence number 16 and TTL 246 and determines that this packet is impaired. Packet 16 is equal to the correct NextExpected sequence number 16 but the TTL number has changed. Packet 16 has the TTL number 246 which does not equal the previous TTL number 245 for packet 15. Accordingly, the application determines that packet 16 is impaired.

Continuing the example in flow 210, the arriving packet has a sequence number 18 and TTL 245, because packet 17 is missing. Since the previous packet had sequence number 16, the application 110 expected the NextExpected sequence number to be 17 not 18. Also, the application 110 detects the TTL change from TTL 246 to TTL 245. Accordingly, the application 110 determines that the packet with the sequence number 18 is impaired.

Subsequently, when the packet having the sequence number 20 (as seen in flow 215) arrives and the NextExpected sequence number is 19, the application 110 determines that the packet with sequence number 19 is missing. At this point, the flow 210 is still not stable, and the application 110 continues evaluating each received packet 150.

Any of the missing packets may arrive at a later time or they may not arrive at all.

Turning to flow 215 in FIG. 2, the application 110 may receive an arriving packet having sequence number 21 and TTL 246, another packet having sequence number 22 and TTL 246, and so forth until the application 110 receives a packet having sequence number 230 and TTL 246. In the flow 215, from sequence number 21 to sequence number 30, each packet has a sequence number that was the NextExpected sequence number and the TTL remained at 246. Since the Qualification Sample is 10 in this example, the application 110 is configured to determine that from sequence number 20 (the start of the evaluation period) to sequence number 30 each of these packets meet the criteria to be a stable Qualification Sample because there are no impaired packets in this Qualification Sample. As such, the packets 20-30 are stable and the flow 215 is determined to be stable by the application 110.

In FIG. 2, the application 110 has determined 3 states, where packets 1-10 is a stable state, packets 11-19 is a not stable state, and packets 20-30 is a stable state. For the sake of clarity this example did not take into account "holes" but further discussion of holes is provided herein. It is understood that FIG. 2 is illustrated for explanation purposes and not for limitation.

Although the states of stable and not stable can be determined by the application 110, in practice more than just the stability of the flow may be needed for a complete evaluation. One would also like to know the characteristics of the stable or not stable flows. For example is the flow stable, but plagued by singleton losses (possibly and indication of congestion and tail drops) or is it a lossless, uneventful period? Similarly what are the characteristics of the unstable flows, do they have burst loss, re-ordering, changes in delay?

FIG. 3 depicts TABLE 1 according to exemplary embodiments. TABLE 1 illustrates an example of sample data that is evaluated by the applications 105 and 110 to show different states in accordance with exemplary embodiments. The configuration of applications 105 and 110 are identical so that they both contain the same software components to function and operate in accordance with exemplary embodiments. For example, TABLE 1 may represent server 10 (Tx) transmitting data to the server 20, and may represent server 20 (Rx) transmitting data back to the server 10. For the sake of explanation the transmit (Tx) direction is from server 10 to server 20, and the receive direction is from server 20 to server 10. Also, since both application 105 and application 110 are identical, reference will be made to application 110 but it is understood that the same applied to application 105.

Exemplary embodiments will show techniques for encoding the states with the data in TABLE 1. TABLE 1 is an excerpted example of a flow (packet stream) showing both stable and not stable states. In TABLE 1, the columns represent the following: the send and receive time of a round trip stream of packets, the inferred round trip delay, the forward path delay, the reverse path delay, the transmit (Tx) sequence number, the receive (Rx) sequence number, the transmit (Tx) time to live counter, and the receive (Rx) time to live counter. In TABLE 1, there are 4 transmit (Tx) states and 4 receive (Rx) states in this packet stream, but the states are not coincident; the arrows in the TABLE 1 show the states. The application 110 is operative to determine stable and not stable states in both the receive direction and the transmit direction. For example, there is a not stable state for a single packet which is sequence number 2285 in the Rx direction. Also, there is a not stable state for a short set of packets from sequence number 2285 to 2288 in the Tx direction.

There are more than 1 billion packets per day, and it would be impractical for a person to visually analyze all of the data (e.g., in TABLE 1) to determine the states from the results of this packet stream. By the application 110, however, using "encoding of states", the same information can be output in a compact form. For each state (e.g., stable and not stable) detected by the application 110, the application 110 encodes the required data for each state into an encoding scheme (shown below as Equation 3) by the application 110 so that the encoding scheme for all of the states (numerous stable state and not stable states) can be utilized for further analysis and displayed on the display 45. An example of the encoding scheme by the application 110 is described as follows:

FirstSeqNo;LastSeqNo;FirstTime;FirstDelay;LastTime;LastDelay;Mask;SkipTotal;LateCount;
MinDelay;MinTTL;MaxTTL. Equation (3)

The following describes the parameters of the encoding scheme (Equation 3):

a. A state is separated by commas from another state, but the descriptors within a single state are separated by semi-colons.
b. FirstSeqNo=the sequence number of the first packet in the state.
c. LastSeqNo=the sequence number of the last packet in the state.
d. FirstTime=the time the packet with the FirstSeqNo was sent (for Tx) or received (Rx).
e. FirstDelay=the one-way delay for the first packet (Tx or Rx). The FirstDelay is the delay of the first packet in the state, it is determined using the difference between the receive (Rx) and transmit (Tx) timestamps on the packet.
f. LastTime=the time the packet with the LastSeqNo was sent (for Tx) or received (for Rx).
g. LastDelay=the one-way delay for the last packet (Tx or Rx). The LastDelay is the delay of the last packet in the state, and it is determined using the Transmit and Receive timestamps on the packet.
h. Mask=a numerical value denoting the stability, and other parameters of interest (explained in more detail below).
i. SkipTotal=the number of skips seen in the sequence numbers, which is equivalent to loss packets plus packets that have not arrived yet.
j. LateCount=the number of late arrivals (i.e., the number of out of order packets).
k. MinDelay=the minimum one way delay seen over the state, which is the minimum of the delays seen (Rx-Tx timestamps) over all packets in the state.
l. MinTTL=the minimum TTL observed in the state
m. MaxTTL=the maximum TTL observed in the state
n. The Mask is a bit encoding such that if Bit 0 is set, the state is stable (all odd values of the Mask are stable states); Bit 1 is set, there is at least 1 skipped packet in the state (lost or late); Bit 2 is set, there is at least 1 late packet (out of order packet) in the state; and Bit 3 is set=> there is a low TTL value <100.

So the Bit value can go from 0-15. A value of 3 would indicate that bit 0 and 1 were set, a stable state with at least one packet skip (could be a loss or a packet that will be late). The 4 bits denote a binary number whose largest value is 15 (all bits set to 1). The following are the exhaustive values of the mask (1) 0000=0 invalid state (unstable, no skip, no late, no low TTL); (2) 0001=1 stable state–no loss, late, or low TTL; (3) 0010=2 unstable state, with skipped packets; (4) 0011=3 stable state with skips; (5) 0100=4 unstable state with late packets; (6) 0101=5 stable state with late packets; (7) 0110=6 unstable state with skipped and late packets; (8) 0111=7 stable state with skipped and late packets; (9) 1000=8 unstable state with low TTL values (invalid state); (10) 1001=9 stable state with low TTL; (11) 1010=10 unstable state with skipped and low TTL packets; (12) 1011=11 stable state with skipped and low TTL packets; (13) 1100=12, unstable state with late and low TTL packets; (14) 1101=13 stable state with late and low TTL packets; (15) 1110=14 unstable state with skipped, late and low TTL packets; (16) 1111=15 stable state with skipped, late and low TTL packets.

By analyzing each arriving packet received at the server 20 for the transmission direction and received at the server 10 for the receive direction, the application 110 is configured to determine that there are 4 states in the Tx direction and 4 states in the Rx direction for the data TABLE 1.

For the transmit direction, the application 110 evaluates each packet received at the server 20 and provides the following encoding scheme for Tx states:

First state: 1;2278;20702358;71;20930033;72;1;0;0;71;246;246

Second state: 2285;2288;20930733;72;20931033;71;0;0;0;71;246;246

Third state: 2289;2304;20931133;72;20932633;72;1;0;0;72;245;245

Fourth state: 2378;9005;20940032;64;21602691;64;1;0;0;63;248;248

For the receive direction, the application 105 evaluates each packet received at the server 10 and provides the following encoding scheme for the Rx states:

First state: 1;2260;20702494;65;20928371;66;1;0;0;65;246;246

Second state: 2261;2278;20928476;71;20930176;71;1;0;0;71;245;245

Third state: 2285;2285;20930868;63;20930868;63;0;0;0;63;244;244

Fourth state: 2286;8932;20930969;65;21602820;65;1;0;0;64;248;248

Although first, second, third, and fourth state are used to explain the encoding scheme of Equation 3, the different states are separated by commas as mentioned above, and the application 110 stores and displays the encoding scheme but first, second, third, and fourth are not stored in the database 120. Using this encoding scheme, the application 110 is operative to determine that between states 1 and 2 and between states 3 and 4 for Tx direction there is a "hole". Between states 1 and 2 in the TX direction, the application 110 is operative to determine that this hole is due to the loss between packets 2278 and 2285 (Tx Seq. numbers). Between states 3 and 4 in Tx direction, the application 110 is operative to determine that this hole is due to the loss between packets 2304 and 2378.

Also, using the encoding scheme, the application 110 is operative to determine that between states 2 and 3 for the Rx direction there is a hole. Between states 2 and 3 in the Rx direction, the application 110 is operative to determine that this hole is due to the loss between packets 2278 and 2285 (Rx Seq. numbers). The application 110 can recognize that the hole between states 1 and 2 in the TX direction corresponds to the hole between states 2 and 3 in the Rx direction.

Along with the state information (presented in the encoding scheme of Equation 3) determined by application 110, to be able to understand and correlate the behavior of the state information, the application 110 is operative to correlate the states with other information referred to as events.

A similar "encoding" may be utilized to define states for events. These events can be defined as having (1) a start time; (2) a duration, which can be 0 for an instantaneous event, but for an event like a flap it could be of finite duration; (3) a location (e.g., interface, router, etc); and (4) the type of event (e.g., such as Open Shortest Path First (OSPF) Cost out, OSPF failure, link failure, etc). For example, the encoding for an event may be Starttime; Duration; Stoptime; Location; Type. Each event may be separated by a comma and stored in the database 120 by the application 110. In FIG. 9 one such a report generated by application 110 is shown, where for each test the time and duration of the "holes" is shown. FIG. 9 illustrates a report for a particular time period in accordance with exemplary embodiments. For example, the report illustrates a reconvergence sequence for a particular time period which illustrates how the network attempted to restore itself during this event. The report is based on test data (i.e., of the state encoding scheme) from a periodic probe with 50 ms spacing between packets on a 15 minute cycle. The hole data is for a flow of packets from New York to New Orleans, a flow of packets from Atlanta to New York, and a flow of packets for Orlando to New Orleans. The application 110 receives an event, which is a link down between Orlando and New Orleans, and the application 110 is operative to correlate the event data, such as start time and/or end time of the event, to the encoding scheme data. In FIG. 9, the report shows the start of hole 1 for each source and destination and shows the duration of hole 1, hole 2, and hole 3 during the event. Also, the report shows the time between holes 1 and 2 and between holes 2 and 3, which infer stable states during these times. Further, the report shows pre-hole 1 time and post hole 3 time. The pre-hole time is the time before the first change of state. So for the pre-hole 1 time in FIG. 9, the test started at 17:15, some 777,863 ms later (or 12 min 51.8 s later) at 17:27:52.9 the first hole started. Similarly, for the post hole 3 time in the last column, the post hole 3 time is the time from the last hole to the end of the test.

The application 110 is operative to correlate the state data of the encoding scheme to the event data. For example, if the application 110 extracts a time period of an event, e.g., stored in the database 120, the application 110 can characterize the flows affected by this particular event. The application 110 may determine that the end (time) of a stable state (switching to a not stable state) coincides with an event like a router 130 failure. Also, the application 110 may determine that the duration of the event may coincide with multiple TTL changes during a not stable state. Since the application 110 has encoded the stable and not stable states using the encoding scheme (i.e., FirstSeqNo;LastSeqNo;FirstTime;FirstDelay;LastTime;LastDelay;Mask;SkipTotal;LateCount;MinDelay;MinTTL;MaxTTL), the application 110 does not have to sift through billions of packets to correlate the packets to the events. Instead, the application 110 can correlate the FirstTime and/or LastTime of the encoded states to the start time of the event. The encoding scheme of the state comprises all the information to understand how the event affected the flow. Several types of events can be tracked and correlated in this fashion, such as link failures, router maintenance, hardware errors, etc. The data in FIG. 9 can be used to unambiguously track a network event (for example a link failure) that happened at a specific time, allowing the user to detect the length of the outage accurately.

In accordance with exemplary embodiments, simulated and/or passively snooped data flows that consist of a single stable state are ideal, and flows with multiple states have suffered one or many data interruptions. The application 110 analyzes the "holes" between stable states in a flow over a period of time, and the hole(s) can then be correlated to a set of known events in the network 30. The application 110 analyzes the flow to produce the "states" in the flow and the correlation of those holes (breaks) in states to network events provides the user valuable information.

Figure 4:
FIG. 4 illustrates a chart in accordance with exemplary embodiments.

More regarding holes is discussed. FIG. 4 illustrates a chart 400 according to exemplary embodiments. Tests input continuous round trip packet streams with packet spacing of 100 ms. For example, packets can be sent from the server 10 to be received by the application 110 at server 20, which is referred to as the transmit (Tx) direction. Also, packets can be sent from the server 20 to be received by the application 105 at the server 10, which is referred to as the transmit (Tx) direction. Analysis can be made (by applications 105 and 110) on state changes in both Tx and Rx directions, using the data in the state encoding scheme, but for conciseness, reference is only made to application 110.

In exemplary embodiments, a state change may occur with impaired packets (such as lost packets, reordered packets, and non-continuous packets) between the two states, which means there is a hole between the two states, and/or a state change may occur without any lost packets. Also, a state change may occur with or without an associated TTL change, and a TTL change does not always imply a loss of packets. A single event (e.g. reconvergence) may cause multiple state changes. Further, a hole can be the time period between the end of one stable state to the start of the next stable state. As such, a hole can have a length of time as discussed more below.

If an event happens it is more likely that there will be several state changes in succession with one or more causing loss, which can be determined by the application 110. There may be periods within the event where packets are getting to the destination.

The start and stop times of the holes themselves may be correlated with network events such as link and router failures and router maintenance. For example, individual types of events (e.g. Link failures) can have distinct signatures, thereby allowing extensive statistical analysis of the type of event in general (such as the distribution of link failure times) to the corresponding hole(s).

Now turning to the chart 400 in FIG. 4, this chart 400 depicts data measurements of data collected and analyzed by the application 110 for August and September; all the state data may be obtained from the state encoding scheme (Equation 3) performed by the application 110 and the events stored in databases 115 and/or 120. The application 110 may display the chart 400 on the display 45.

The application 110 is operative to illustrate the total state changes for both August and September in box 405 and illustrate the total number of path changes (i.e., TTL changes) that are associated with the state changes for each month in box 410. A path change is determined by the application 110 when a TTL value changes.

The application 110 is operative to illustrate the total number of events for August and September in box 415. Since the events may be stored in databases 115 and 120, the application 110 can download the events for any given time (subsecond, second, minute, hour, multiple hours, etc.), day(s), month(s), and/or year(s) and then compare the events to the state changes data of the encoding scheme to determine the average state changes per event as shown in box 420.

The application 110 is operative to illustrate the average number of state changes per day in box 425. Also, the application 110 is operative to illustrate the average number of loss-causing state change per day that are greater than a certain time period, such as greater than 100 ms in box 430. The application 110 is operative to determine the average loss-causing state changes per day, e.g., greater than 100 milliseconds (ms) per pair, such as both the transmission direction and receive direction in box 435.

Figure 5:
FIG. 5 illustrates an example of two-way measurement data in a chart in accordance with exemplary embodiments.

FIG. 5 illustrates an example of two-way measurement data in a chart 500 for the month of August according to exemplary embodiments. For any desired time period (such as the month of August in this example), the application 110 is operative to analyze and compare the state encoding scheme data and the events data in databases 115 and 120. After performing analysis on the state encoding scheme and events, the application 110 is configured to provide the chart 500 to be displayed on the display 45. Although application 110 may be specified, the application 105 is configured to perform the same operations, and it is understood that any operation discussed for application 111 applies to application 105.

The application 110 illustrates the total number of state changes for August in box 505. The application is operative to determine the number of holes in box 510 and the number of holes greater than 100 ms in box 515. The application 110 is operative to determine the average hole length in box 520. Also, the application 110 is operative to determine for each event the average length of holes greater than 100 ms in box 525. As seen in the chart 500 and below in chart 600, a hole is the time between the end of one stable state to the start of the next (subsequent) stable state.

Figure 6:
FIG. 6 illustrates an example of two-way measurement data in a chart in accordance with exemplary embodiments.

FIG. 6 illustrates two-way measurement data in chart 600 for the month of September according to exemplary embodiments. Although the month of September is displayed on the display 45 by the application 110, it is understood that the application 110 is operative to analyze and compare the state encoding scheme data and the events data in databases 115 and 120 for any desired time period.

The application 110 illustrates the total number of state changes for September in box 605. The application 110 illustrates that is operative to determine the number of holes in box 610 and the number of holes greater than 100 ms in box 615. The application 110 is operative to determine the average hole length in box 620. Also, the application 110 is operative to determine for each event the average length of holes greater than 100 ms in box 625.

It is understood by one skilled in the art that each element described in the present disclosure contains all the necessary hardware, software, and/or firmware to operate and function as discussed herein in accordance with exemplary embodiments.

Figure 7:
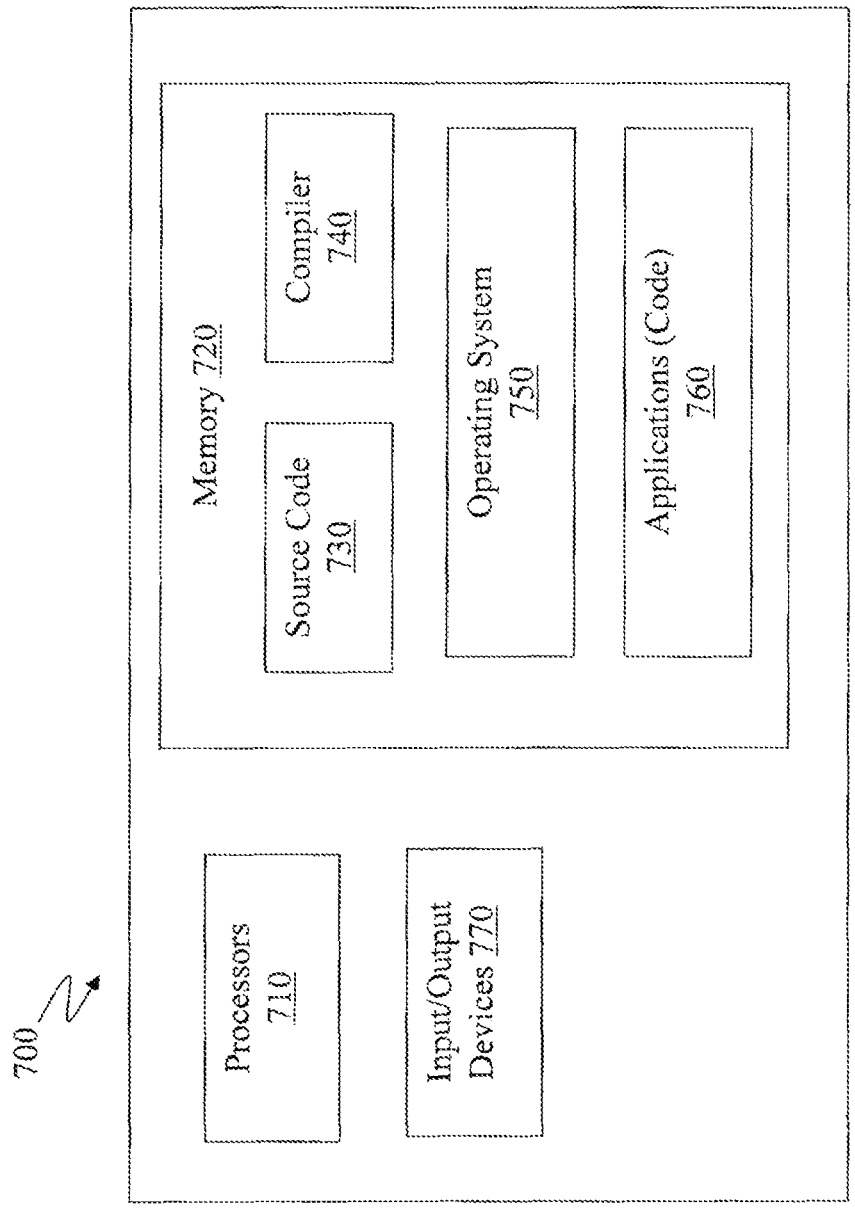
FIG. 7 illustrates a computer having elements utilized in exemplary embodiments.

FIG. 7 illustrates an example of a computer 700 that may be utilized in implementing exemplary embodiments. For example, the computer 700 may have one or more elements that may be utilized in implementing the routers 130 and the servers 10 and 20, and any applications in accordance with exemplary embodiments. The computer 700 includes, but is not limited to, PCs, workstations, systems, laptops, PDAs, palm devices, servers, mobile devices, communication devices, cell phones, computer systems, set top boxes (STB), televisions (TV), game consoles, MP3 players, and the like. The computer 700 may include one or more processors 710, memory 720, and one or more input and/or output (I/O) 770 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in computer readable storage memory 720. The processor 710 can be virtually any custom made or commercially available processor, a central processing unit (CPU), a data signal processor (DSP), or an auxiliary processor among several processors associated with the computer 700, and the processor 710 may be a semiconductor based microprocessor (in the form of a microchip) or a macroprocessor.

The computer readable storage memory 720 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the computer readable storage memory 720 may incorporate electronic, magnetic, optical, and/or other types of storage media. Note that the computer readable storage memory 720 can have a distributed architecture, where various components are situated remote from one another, but can be accessed by the processor 710.

The software in the computer readable storage memory 720 may include one or more separate programs, each of which comprises an ordered listing of executable instructions for implementing logical functions. In the example illustrated in FIG. 7, the software in the computer readable storage memory 720 includes a suitable operating system (O/S) 750, compiler 740, source code 730, and one or more applications 760 (or modules) of the exemplary embodiments.

The operating system 750 controls the execution of other computer programs, and provides scheduling, input-output control, file and data management, memory management, and communication control and related services. It is contemplated by the inventors that the application 760 for implementing exemplary embodiments is applicable on all other commercially available operating systems.

The application 760 may be a source program, executable program (object code), script, or any other entity comprising a set of instructions to be performed. When a source program is to be executed, then the program is usually translated via a compiler (such as the compiler 740), assembler, interpreter, or the like, which may or may not be included within the computer readable storage memory 720, so as to operate properly in connection with the O/S 750. Furthermore, the application 760 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 770 may include input devices such as, for example but not limited to, a mouse, keyboard, scanner, microphone, remote controller, camera, biometric input device(s), a vibrator device for non-audible alert, etc. Furthermore, the I/O devices 770 may also include output devices, for example but not limited to, a printer, display, speaker, etc. Also, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 include may include modems, gateways, receivers, transmitters, transceivers, etc. for communicating over a communications network.

When the computer 700 is in operation, the processor 710 is configured to execute software stored within the computer readable storage memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software, it should be noted that the application 760 can be stored on virtually any computer readable storage memory for use by or in connection with any computer related system or method. In the context of this document, a computer readable storage memory may be an electronic, magnetic, optical, or other physical device or means that can contain or store a computer program for use by or in connection with a computer related system or method.

The application 760 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable storage medium can be stored, communicated, propagated, or transported for use by or in connection with the instruction execution system, apparatus, or device.

More specific examples (a nonexhaustive list) of the computer-readable storage medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 760 is implemented in hardware, the application 760 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 8:
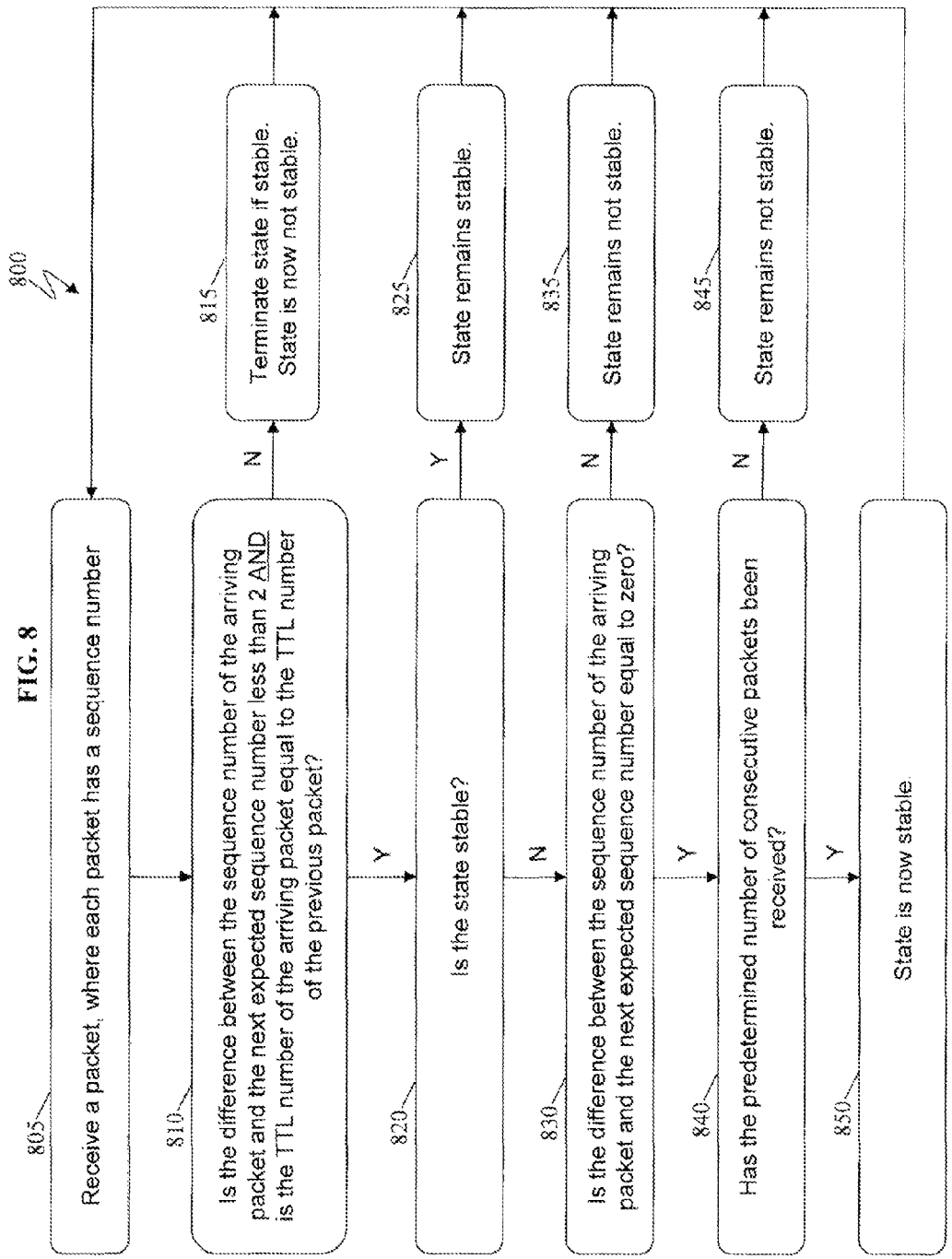
FIG. 8 illustrates a method for detecting states and encoding the states in accordance with exemplary embodiments.

FIG. 8 illustrates a method for detecting states and encoding the states by the application 110 in accordance with exemplary embodiments.

The application 110 is operative to receive a flow of packets, where each transmitted packet has a monotonically increasing integer sequence number at operation 805.

The application 110 is operative to determine if the difference between the sequence number of the arriving packet and the next expected sequence number is less than 2 and if the TTL number of the arriving packet is equal to the TTL number of the previous packet at operation 810. If no at operation 810, the application 110 is operative to terminate the state if there is currently a stable state and/or to determine that the state is a not stable state at operation 815.

If yes at the operation 810, the application 110 is operative to determine if the state is a stable state at operation 820. If yes at the operation 820, the application 110 is operative to determine that the state remains stable at operation 825. Since the state was stable, there has to be 2 skipped packets to transition to a not stable state, so the state remains stable as shown at the operation 825.

If no at the operation 820, the application 110 is operative to determine if the difference between the sequence number of the arriving packet and the next expected sequence number is equal to zero at operation 830.

If no at operation 830, the application 110 is operative to determine that the state remains not stable at operation 835.

If yes at operation 830, the application 110 is operative to determine if the predetermined number of consecutive packets have been received at operation 840.

If no at operation 840, the application 110 is operative to determine that the sate remains not stable at operation 845.

If yes at operation 840, the application 110 is operative to determine that the state is now stable at operation 850.

The method 800 continues for each received packet. Also, an individual stable or not stable state can continue indefinitely.

Further, in accordance with exemplary embodiments, to declare a stable state, the application 110 needs 10 ideal packets (as a qualification sample X). Once the stable state is determined, to declare (change to) a not stable state, the application 110 needs a 2 packet skip in the sequence number. Also, once a stable state is declared the application 110 will allow single skips in the packets received, i.e., the sequence number, and the application 110 will not transition from the stable state to the not stable state.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a computer readable storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits. It is understood that computer program code can be transmitted over some transmission medium, loaded into and/or executed by a computer, or transmitted over some transmission medium, such as over electrical wiring or cabling, through fiber optics, or via electromagnetic radiation.

While features have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the present disclosure without departing from the essential scope thereof. Therefore, it is intended that the present disclosure not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for determining states in a flow of transmitted packets, comprising:
   receiving the flow of transmitted packets, where each transmitted packet has a monotonically increasing integer sequence number;
   wherein a next expected sequence number is equal to a largest previous sequence number of a previous packet received incremented by 1 and the next expected sequence number is in a monotonically increasing series with non-reversing values;
   for a predefined number of consecutively received packets, when a difference between a sequence number of an arriving packet and the next expected sequence number is equal to zero and when a time to live number of the arriving packet is equal to a time to live number of the previous packet, determining that there is a stable state for the predefined number of consecutively received packets;
   for each received packet, when it is determined that the sequence number of the arriving packet is greater than a calculated next expected sequence number by more than 1, determining that a not stable state exists; and
   determining a number of holes by a computer, wherein each of the holes is a time between an end of one stable state and a start of a next stable state.

2. The method of claim 1, further comprising after determining that there is the stable state for the predefined number of consecutively received packets, continuing the stable state for each subsequent arriving packet, when the difference between the sequence number of the arriving packet and the next expected sequence number is not greater than 1 and when the time to live number of the arriving packet is equal to the time to live number of the previous packet.

3. The method of claim 1, further comprising after determining that there is the stable state for the predefined number of consecutively received packets, transitioning to the not stable state when the difference between the sequence number of the arriving packet and the next expected sequence number is greater than 1.

4. The method of claim 1, further comprising after determining that there is the stable state for the predefined number of consecutively received packets, transitioning to the not stable state when the time to live number of the arriving packet is not equal to the time to live number of the previous packet.

5. The method of claim 1, wherein an individual stable state continues.

6. The method of claim 1, further comprising for each received packet, when the time to live number of the arriving packet is not equal to the time to live number of the previous packet, determining that the not stable state exists.

7. The method of claim 1, wherein the holes contain packets that do not satisfy conditions for the stable state.

8. The method of claim 1, further comprising determining a number of state changes between the stable state and the not stable state.

9. The method of claim 1, further comprising receiving events related to the flow of transmitted packets;

correlating the events to a plurality of stable states and a plurality of not stable states.

10. A computing device, comprising:
memory for storing a program for determining states in a flow of transmitted packets; and
a processor, functionally coupled to the memory, the processor being responsive to computer-executable instructions contained in the program and operative to:
receive the flow of transmitted packets, where each transmitted packet has a monotonically increasing integer sequence number;
wherein a next expected sequence number is equal to a largest previous sequence number of a previous packet received incremented by 1 and the next expected sequence number is in a monotonically increasing series with non-reversing values;
for a predefined number of consecutively received packets, when a difference between a sequence number of an arriving packet and the next expected sequence number is equal to zero and when a time to live number of the arriving packet is equal to a time to live number of the previous packet, determine that there is a stable state for the predefined number of consecutively received packets;
for each received packet, when it is determined that the sequence number of the arriving packet is greater than a calculated next expected sequence number by more than 1, determine that a not stable state exists; and
determine a number of holes, wherein each of the holes is a time between an end of one stable state and a start of a next stable state.

11. The device of claim 10, wherein the processor after determining that there is the stable state for the predefined number of consecutively received packets, continues the stable state for each subsequent arriving packet, when the difference between the sequence number of the arriving packet and the next expected sequence number is not greater than 1 and when the time to live number of the arriving packet is equal to the time to live number of the previous packet.

12. The device of claim 10, wherein the processor after determining that there is the stable state for the predefined number of consecutively received packets, transitions to the not stable state when the difference between the sequence number of the arriving packet and the next expected sequence number is greater than 1.

13. The device of claim 10, wherein the processor after determining that there is the stable state for the predefined number of consecutively received packets, transitions to the not stable state when the time to live number of the arriving packet is not equal to the time to live number of the previous packet.

14. The device of claim 10, wherein an individual stable state continues.

15. The device of claim 10, wherein the processor for each received packet, when the time to live number of the arriving packet is not equal to the time to live number of the previous packet, determines that a not stable state exists.

16. The device of claim 10, wherein the holes contain packets that do not satisfy conditions for the stable state.

17. The device of claim 10, wherein the processor determines a number of state changes between the stable state and the not stable state.

18. The device of claim 10, wherein the processor receives events related to the flow of transmitted packets;
correlates the events to a plurality of stable states and a plurality of not stable states.

19. A computer program product, tangibly embodied on a computer readable storage medium, the computer program product including instructions for causing a computer to execute a method for determining states in a flow of transmitted packets, comprising:
receiving a flow of transmitted packets, where each transmitted packet has a monotonically increasing integer sequence number;
wherein a next expected sequence number is equal to a largest previous sequence number of a previous packet received incremented by 1 and the next expected sequence number is in a monotonically increasing series with non-reversing values;
for a predefined number of consecutively received packets, when a difference between a sequence number of an arriving packet and the next expected sequence number is equal to zero and when a time to live number of the arriving packet is equal to a time to live number of the previous packet, determining that there is a stable state for the predefined number of consecutively received packets;
for each received packet, when it is determined that the sequence number of the arriving packet is greater than a calculated next expected sequence number by more than 1, determining that a not stable state exists; and
determining a number of holes, wherein each of the holes is a time between an end of one stable state and a start of a next stable state.

20. The computer program product of claim 19, further comprising after determining that there is the stable state for the predefined number of consecutively received packets, continuing the stable state for each subsequent arriving packet, when the difference between the sequence number of the arriving packet and the next expected sequence number is not greater than 1 and when the time to live number of the arriving packet is equal to the time to live number of the previous packet.

* * * * *